Figure 1:
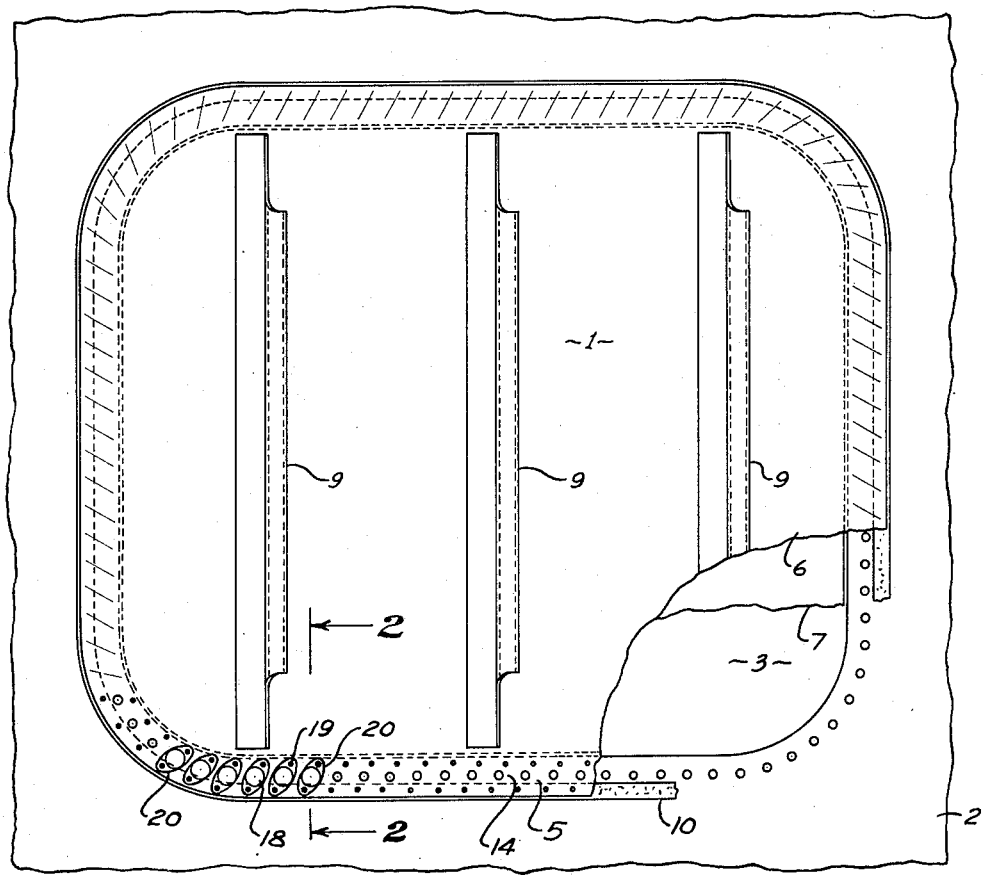

May 20, 1952   F. E. SNOW   2,597,682
COVER CONSTRUCTION
Filed June 25, 1946

INVENTOR
Floyd E. Snow
BY John Flam
ATTORNEY

Patented May 20, 1952

2,597,682

UNITED STATES PATENT OFFICE 2,597,682

COVER CONSTRUCTION

Floyd E. Snow, Pasadena, Calif., assignor to Technical Coatings, Inc., Los Angeles, Calif., a corporation of California Application June 25, 1946, Serial No. 679,287

3 Claims. (Cl. 220—46)

This invention relates to covers for access holes or other openings in fuel tanks, or the like; more particularly it relates to means for securing and sealing such covers in a fluid-tight manner.

It is an object of this invention to provide a cover which may be readily secured on a tank, or the like, against movement with respect thereto.

It is another object of this invention to provide a cover employing a sealing gasket, and arranged to prevent shearing or rupture of the gasket.

It is still another object of this invention to provide a cover for fuel tank access holes, or the like, which may be installed readily without the use of special skill or tools, and in a manner to insure against subsequent leakage.

This invention possesses many other advantages, and has other objects which may be made more clearly apparent from a consideration of one embodiment of the invention. For this purpose there is shown a form in the drawing accompanying and forming part of the present specification. The form will now be described in detail illustrating the general principles of the invention; but it is to be understood that this detailed description is not to be taken in a limiting sense, since the scope of this invention is best defined by the appended claims.

Figure 2:
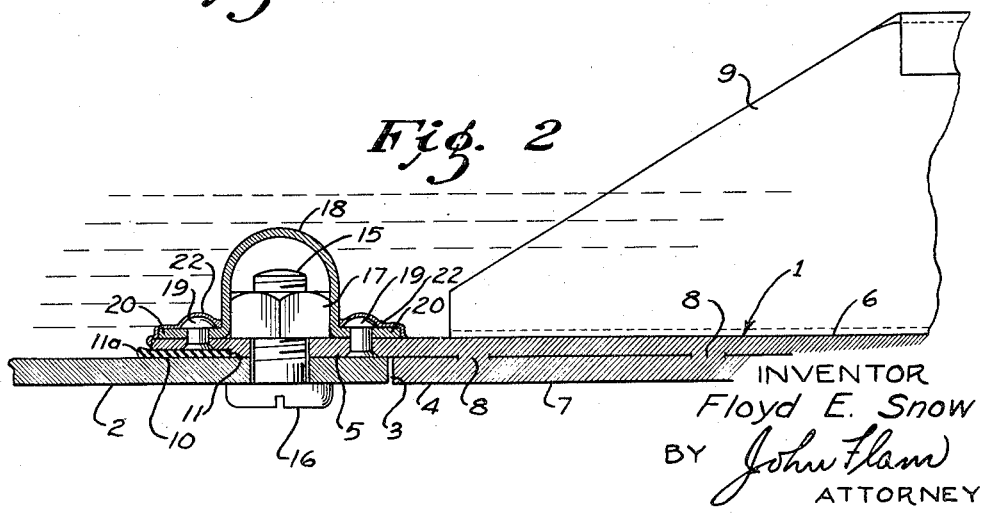

In the drawing:

Figure 1 is a plan view partly broken away, showing a cover embodying the features of the invention installed in a fuel tank; and Fig. 2 is a fragmentary section on an enlarged scale, taken as indicated by line 2—2 in Fig. 1.

Referring to the drawing, the cover or closure 1, is shown as of a generally rectangular shape with rounded corners. This cover is secured to the shell or skin 2 of a tank, which may be an airplane fuel tank having an access hole or other opening 3, so as to close the opening 3 in a fluid-tight manner.

The cover 1 is adapted substantially entirely to cover the opening 3 when in place, and present an outer face 4 which is flush with the outside of the shell 2. The cover 1 is substantially larger than the opening 3, so as to provide a marginal portion 5 adapted to overlie the shell 2 about the opening 3. For this purpose, the cover may comprise conveniently the plates 6 and 7, joined as by spot welding, indicated at 8. The plate 6 provides the marginal extension 5; the plate 7 conforms in outline to the opening 3, and has the same thickness as the shell, so as to provide the flush surface 4. Suitable stiffeners 9 may be provided for the cover 1, being secured preferably on the inner surface thereof as by spot welding.

The overlapping marginal portion 5 of the cover 1 is secured in fluid-tight relation on the shell 2, as will now be described.

It is common to provide a layer of resilient or deformable material for sealing between two surfaces connected by bolts, rivets, or the like, which urge the surfaces toward each other, thus compressing the material into sealing relation with surfaces. However, in such an arrangement, the yieldability of the gasket makes it impossible to prevent relative movement between the surfaces, such movement in turn soon destroying the seal and causing a leak. In the instant arrangement, the cover 1 is secured to the shell 2 in a manner to provide metal-to-metal contact, and to prevent relative movement. At the same time a gasket 10 is provided to seal between the cover 1 and the shell 2, being accommodated in an under cut or rabbet 11 extending about the edge of the cover 1. In this way, the outer edge portion 11-a of the gasket is continuously exposed to the contents of the tank. Furthermore, since the cover 1 is tightly clamped against the inside surface of shell 2, there is an assurance that no shear stresses need be sustained by the gasket 10. This gasket sustains only a compression force.

The thickness of the gasket 10 is so chosen that a fluid-tight seal is formed when the marginal portion 5 of the cover 1 is drawn into contact with the shell 2. Additionally, if desirable, it may be formed of some material which will expand when exposed to the contents of the tank, thus increasing the effectiveness of the seal. For example, the gasket may be formed of a neoprene-type material when the tank is to be used for gasoline, material of this type swelling when brought into contact with gasoline.

As a means of securing the cover 1 in place, a single row 14 of closely spaced screws 15 is provided. These screws 15 pass through the shell 2 and the marginal cover portion 5, the screw heads 16 being outside the shell 2, and being quite thin.

To facilitate tightening of the screws 15, the nuts 17 which the screws engage are each provided with a holding cup 18 for maintaining the nut in screw receiving position, as well as for preventing the nut from rotating. Each cup 18 is secured to the cover by a pair of small rivets 19, passing through ears 20 on the cup. The cup 18 serves to prevent leakage along the associated screw 15, the cup 18 being sealed to the cover 1 by appropriate material, such as paint "dope" or putty, indicated by 22, applied about the heads of the rivets 19 and along the edge of the cup.

The inventor claims:

1. In a device of the character described: means forming a tank wall having an opening; a cover having an extension located within the tank wall and overlapping the edges of the opening, said cover extension having a surface making direct contact with a face of said wall adjacent said opening; said cover extension having a groove peripherally thereof forming a recess;

a sealing member in said recess engaged by said extension to be forced by said extension against said face; said sealing member normally having a thickness greater than the depth of said recess; and cover fastening means passing through the cover and the tank wall without passing through the sealing member.

2. In a device of the character described: means forming a tank wall having an opening; a cover having an extension located within the tank wall and overlapping the edges of the opening, said cover extension having a surface making direct contact with an inner face of said wall adjacent said opening; said cover extension having a groove forming a recess around the area of contact of said extension with the face of the tank wall; an imperforate sealing member in said recess engaged by the extension to be forced by said extension against said face; said sealing member normally having a thickness greater than the depth of said recess; and cover fastening means passing through the cover and the tank wall inwardly of said sealing member without passing through the sealing member.

3. In a device of the character described; means forming a tank wall having an opening; a cover having an extension located within the tank wall and overlapping the edges of the opening, said cover extension having a surface making direct contact with an inner face of said wall adjacent said opening; said cover extension having a groove forming a recess disposed peripherally of said face contacting surface; an imperforate sealing member in said recess engaged by said cover extension to be forced by said cover extension against said face; said sealing member normally having a thickness greater than the depth of said recess; a plurality of bolts passing through the cover and the tank wall inwardly of said sealing member for urging said surface into intimate contact with the tank wall face; means enclosing the inner ends of the bolts, said enclosing means being attached to the inside of the cover; and means insuring against leaks into said enclosing means.

FLOYD E. SNOW.

REFERENCES CITED

The following references are of record in the file of this patent:

UNITED STATES PATENTS

| Number | Name | Date |
|---|---|---|
| 629,829 | Tidemann | Aug. 1, 1899 |
| 1,327,965 | Rotter | Jan. 13, 1920 |
| 1,462,353 | Musted | July 17, 1923 |
| 1,536,272 | Scheib | May 5, 1925 |
| 1,649,720 | Moffit | Nov. 15, 1927 |
| 1,691,609 | Oskrit | Nov. 13, 1928 |
| 1,888,459 | Greve | Nov. 22, 1932 |
| 1,903,012 | Rosenblueth | Mar. 28, 1933 |
| 2,037,151 | Safford | Apr. 14, 1936 |
| 2,173,999 | Grundstrom | Sept. 26, 1939 |
| 2,353,589 | Sandberg | July 11, 1944 |
| 2,384,386 | Malmberg | Sept. 4, 1945 |
| 2,424,800 | Conerley et al. | July 29, 1947 |
| 2,430,542 | Thompson | Nov. 11, 1947 |

FOREIGN PATENTS

| Number | Country | Date |
|---|---|---|
| 542,051 | Great Britain | Dec. 23, 1941 |